United States Patent Office 2,840,615
Patented June 24, 1958

2,840,615

PRODUCTION OF ACETALS WITH REACTIVATION OF CATALYST

Adin L. Stautzenberger, Corpus Christi, Tex., assignor to Celanese Corporation of America, New York, N. Y., a corporation of Delaware No Drawing. Application August 9, 1954
Serial No. 448,765

5 Claims. (Cl. 260—615)

This invention relates to the production of acetals, and relates more particularly to the production of acetals by the reaction of aldehydes and alcohols in the presence of an acidic cationic exchange resin.

It is an object of this invention to provide a novel, economical and efficient process for the production of acetals by the reaction of aldehydes and alcohols in the presence of an acidic cation-exchange resin.

Another object of this invention is the provision of a new and practical method for the production of dimethyl acetal in the presence of an acidic cation-exchange resin.

Other objects of this invention will be apparent from the following detailed description and claims.

The production of acetals by the reaction of aldehydes and alcohols in the presence of a catalyst comprising a strongly acid cation-exchange resin is known to the art. This reaction is preferably carried out continuously by passing a stream of a liquid mixture containing the alcohol and the aldehyde through a bed of the acidic cation-exchange resin, which resin is, of course, insoluble in said liquid mixture. I have found, however, that when certain alcohols or aldehydes containing small amounts of impurities are employed, the acidic cation-exchange resin loses its catalytic activity after a relatively short period of time.

In accordance with this invention I have found that the presence of small amounts of epoxy compounds, such as alkylene oxides, causes gradual deactivation of the cation-exchange resin, such deactivation being probably due to the formation of a compound by reaction between the epoxy compound and the resin at the sulfonic groups of the latter. I have also found that the inactivated catalyst can be regenerated easily by reacting it with water, preferably with hot water having a temperature of at least about 50° C., and that during this reaction with water a glycol is produced. The catalyst thus regenerated is equal to fresh catalyst in activity.

The process of this invention has been found to be especially suitable for use in the preparation of dimethyl acetal by the reaction of methanol with acetaldehyde containing ethylene oxide as an impurity. Examples of other alcohols and aldehydes which may be reacted in accordance with the process of this invention, to produce such acetals as diethyl acetal, diethyl formal, dipropyl acetal, dimethyl propional and dibutyl butyral, include, among the alcohols, ethanol, propanol, butanol, ethylene glycol, and, among the aldehydes, formaldehye, propionaldehyde, and butyraldehyde. It is desirable, of course, to employ alcohols and aldehydes whose substituents, if any, do not materially interfere with the course of the reaction.

The cation-exchange resin employed as the catalyst should be strongly acidic. Particularly effective resin catalysts are those containing sulfonic acid groups such as the resins of U. S. Patent No. 2,366,007, e. g. the sulfonated styrene-divinyl benzene copolymers. Other suitable cation-exchange resins are, for example, the phenol sulfonic acid-formaldehyde reaction products.

The reaction between the alcohol and the aldehyde in the presence of the cation-exchange resin is conveniently carried out at a temperature of about 20 to 100° C. preferably about 25 or 30 to 60° C. Advantageously, the alcohol and aldehyde are employed in the stoichiometric ratio necessary to produce the desired acetal, but higher or lower ratios may be used. The contact time between the resin and the reactants is preferably sufficient to cause the reaction mixture to reach equilibrium. After equilibrium is reached no additional amount of the acetal is produced.

The following example is given to illustrate the reaction further.

*Example 1*

Acetaldehyde, containing 0.5% by weight of ethylene oxide and 0.3% of methyl formate, is mixed with methanol in the proportion of ½ mole of acetaldehyde per mole of methanol and the resulting substantially anhydrous mixture is passed continuously at a constant rate through a bed of "Amberlite IR–120 (H) AG," a strongly acid cation-exchange resin, in bead form, containing sulfonic acid groups, at such a rate that the contact time between the reactants and the catalyst is 10 minutes. The resin bed is maintained at a temperature of 25° C. The stream emerging from the bed of resin contains acetaldehyde, methanol, water, dimethyl acetal and a small amount of ethylene glycol. 51% of the acetaldehyde fed is consumed during the reaction, the efficiency of conversion of the acetaldehyde and methanol to the dimethyl acetal being substantially quantitative.

For a period of 19 hours, during which the amount of feed-mixture passed through the bed of resin is 113 parts by weight per part of resin, the concentration of acetaldehyde in the reacted mixture emerging from the bed of catalyst is substantially constant, but after this period the concentration of acetaldehyde in said reacted mixture begins to increase, showing that the resin has become partially deactivated. The resin is then treated with water at 100° C. for about 15 hours with an amount of water sufficient to wet said resin. The resulting wet reactivated resin is employed for the above reaction of acetaldehyde and methanol and is found to be equal to fresh resin in activity. Ethylene glycol, produced during the reactivation treatment, is found in the water used in said treatment.

The reacted mixture obtained according to the above example may be treated to remove the water of reaction and the unreacted acetaldehyde therefrom. For example, the mixture may be subjected to two distillations, in one of which the organic constituents thereof are distilled overhead, leaving the water behind, and in the second of which the acetaldehyde is distilled overhead. The resulting residual mixture of dimethyl acetal and methanol may then be subjected to pyrolysis in the presence of a catalyst, in known manner, to produce methyl vinyl ether. Alternatively, the step of removing the acetaldehyde may be omitted and a mixture containing methanol, acetaldehyde and dimethyl acetal may be subjected to the aforementioned pyrolysis reaction.

It is to be understood that the foregoing detailed description is given merely by way of illustration and that many variations may be made therein without departing from the spirit of my invention.

Having described my invention, what I desire to secure by Letters Patent is:

1. Process for the production of acetals which comprises reacting in the presence of a strongly acidic cation-exchange resin a mixture of an alcohol and an aldehyde reactive with said alcohol to form an acetal, said mixture containing a minor amount of an aliphatic alkylene mono-epoxide which tends to deactivate said resin, separating the resulting acetal-containing mixture from said resin, and reacing the resulting at least partially deactivated resin with water at an elevated temperature and for a time sufficient to reactivate said resin.

2. Process for the production of acetals which comprises reacting, in the presence of a strongly acidic cation-exchange resin, a mixture of methanol and acetaldehyde, said mixture containing a minor amount of ethylene oxide, separating the resulting dimethyl acetal-containing mixture from said resin, and reacting the resulting at least partially deactivated resin with water at an elevated temperature and for a time sufficient to reactivate said resin.

3. Process as set forth in claim 2 in which the reaction between the at least partially deactivated resin and the water is carried out at a temperature of at least about 50° C.

4. Process for the production of dimethyl acetal which comprises continuously passing a stream of a mixture of methanol and acetaldehyde containing a minor amount of ethylene oxide through a bed of a strongly acidic cation-exchange resin containing sulfonic acid groups until the acetaldehyde content of the stream emerging from said bed begins to increase, showing that the resin has become at least partially deactivated, and reacting the resulting at least partially deactivated resin with water at an elevated temperature and for a time sufficient to reactivate said resin and to form ethylene glycol.

5. Process for the production of dimethyl acetal which comprises continuously passing a stream of a mixture of methanol and acetaldehyde containing a minor amount of ethylene oxide and methyl formate through a bed of a strongly acidic cation-exchange resin containing sulfonic acid groups until the acetaldehyde content of the stream emerging from said bed begins to increase, showing that the resin has become at least partially deactivated, and reacting the resulting at least partially deactivated resin with water at an elevated temperature and for a time sufficient to reactivate said resin and to form ethylene glycol.

References Cited in the file of this patent

UNITED STATES PATENTS 2,566,559  Dolnick et al. _____ Sept. 4, 1951

FOREIGN PATENTS 676,891  Great Britain _____ Aug. 6, 1952